3,211,624
METHOD AND MEANS FOR CONTROLLING THE START OF A HOMOGENEOUS NUCLEAR REACTOR
Björn Widell, Vasteras, Sweden, assignor to Allmanna Svenska Elektriska Aktiebolaget, Vasteras, Sweden, a corporation of Sweden
Filed Sept. 17, 1963, Ser. No. 309,422
Claims priority, application Sweden, Sept. 25, 1962, 10,272/62
4 Claims. (Cl. 176—47)

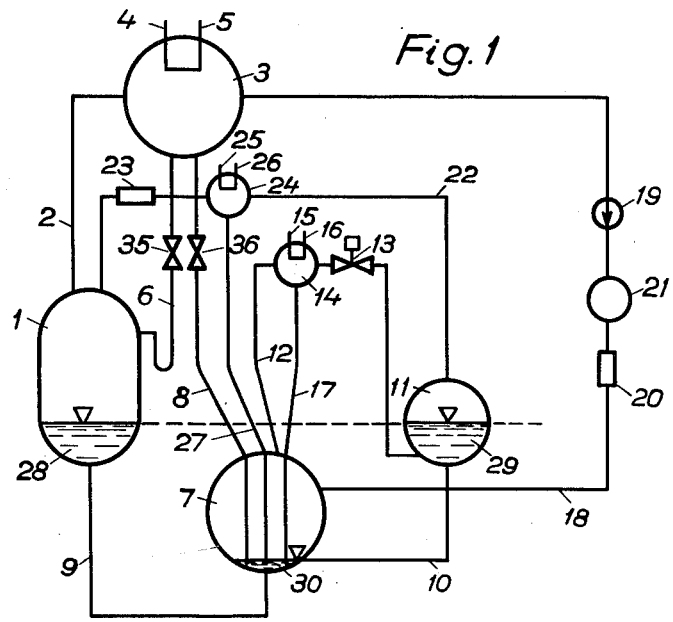
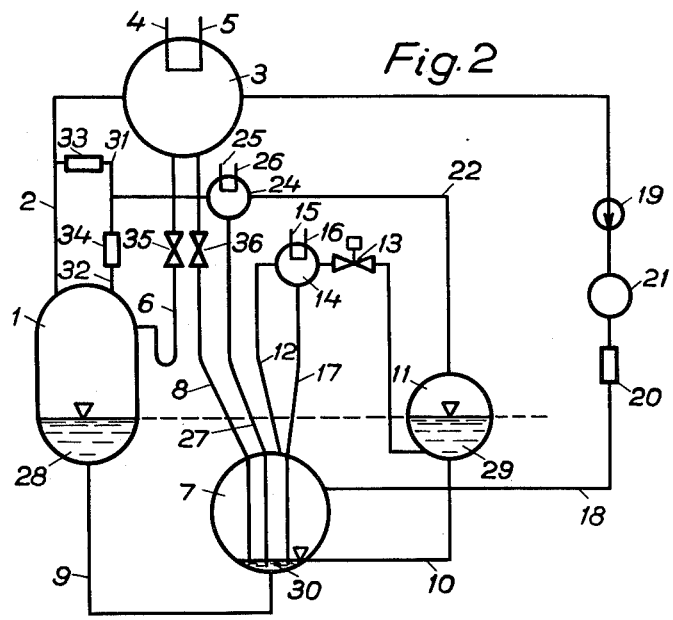

During operation a homogeneous boiling reactor generates steam which is condensed while the heat thus liberated is taken care of. The steam is formed in the actual reactor vessel, where the fuel composition is situated, by volatilization of the coolant. The heat is taken care of in the condensers. These condensers, possible recombiners for radiolytic gas and other means, through which the steam or a part of the steam is lead and associated conduits for introducing steam and conduits for returning the condensate, together form a system which will in the following be called the primary steam circuit of the reactor.

Homogeneous boiling reactors show great advantages in comparison with other homogeneous reactors where the reactor flows circulate through heat exchangers. Amongst the advantages may be mentioned that the radioactive solution or dispersion is completely enclosed in the reactor vessel and the fuel-preparing apparatus and does not come into contact with the heat-transfer surfaces, that circulation pumps can be dispensed with, that the thermal efficiency is higher and that the risk of excursions is small due to rapid self-stabilization at sudden changes in reactivity. However, not much interest is shown in the homogeneous reactors, mainly because of the supposed start, operation and shutdown difficulties which mean that repair and exchange of damaged apparatus such as pumps, control valves or other required equipment for process control in contact with the fuel composition is extremely complicated and may require a long shut-down time for the reactor. The reason for this is the extremely strong radioactivity of the fuel composition. Because fuel compositions in the form of solutions of feasible fissile material in water are instable when in contact with stainless steel and in the oxygen deficient conditions prevailing in the boiling core, one has been restricted to the use of fuel compositions in the form of dispersions. The use of such dispersions, however, causes added difficulties because of the risk of sedimentation and plugging.

The present invention is directed at a solution of the problems arising at the start of homogeneous reactors. Previously arising difficulties are avoided by controlling the start of the reactor with a minimum of movable parts so that part of the apparatus which is in contact with the fuel composition requires no maintenance.

The present invention relates to a method of controlling the start of a homogeneous nuclear reactor in a reactor system, comprising a reactor vessel which, under operation, contains a fuel composition comprising a fissile material dissolved or dispersed in a liquid coolant, from which steam is produced, the heat content of which is carried off during condensation of the steam in a primary steam circuit. The method according to the invention is characterised in that the reactor vessel with a conduit is placed in free liquid transport communication with a sub-critical collecting vessel arranged at a lower level and having sufficiently large volume to contain at shutdown of the reactor, fuel composition necessary for operation of the reactor, that the collecting vessel with another conduit is put in free liquid transport communication with a sub-critical storage vessel arranged substantially at the same level as the reactor vessel, and that the fuel composition which before the start is stored in the collecting vessel is by effecting a pressure difference between the gas phases on the one side in the collecting vessel and on the other side in the reactor vessel and the storage vessel forced up into the reactor vessel and the storage vessel through the conduits between respective vessels with such distribution of the fuel composition between the reactor vessel and the storage vessel that the reactor vessel is supplied with an amount of fuel composition suitable for start of the reactor and the storage vessel substantially all remaining fuel composition, whereupon preferably after the part of the fuel composition supplied to the reactor vessel has reached boiling and intended operating pressure is reached, the part of the fuel composition supplied to the storage vessel, by equalizing the pressure difference in the gas phases between the collecting vessel and the storage vessel and effecting a pressure difference between the gas phases on the one side in the reactor vessel and on the other side in the collecting vessel and the storage vessel is returned to the collecting vessel and distributed between the collecting vessel and the reactor vessel so that a desired reactor effect can be maintained.

It is particularly advantageous to effect said pressure difference between the gas phases in on the one side the collecting vessel and on the other side the reactor vessel and storage vessel with a flowing gas which is led into the collecting vessel and, when it has forced up the fuel composition in the reactor vessel and the storage vessel, the gas phases of which are kept in open communication with each other, is led further through the open conduit between the collecting vessel and the storage vessel and through the last mentioned vessel and through the liquid stored in the last mentioned vessel. So that the flowing gas shall leave the collecting vessel in this way the conduit between the collecting vessel and the storage vessel is connected to the collecting vessel at a higher level than the conduit between the collecting vessel and the reactor vessel. By leading the gas in the manner indicated the quantity of fuel composition in the reactor vessel will be independent of the gas flow, so that no gas flow control is required. The flowing gas led to the collecting vessel may be further utilized to bring about the pressure difference between the gas phases in on the one side the reactor vessel and on the other side the collecting vessel and storage vessel which is required for distribution of the part of the fuel composition stored in the storage vessel between the reactor vessel and the collecting vessel. This takes place by the gas being led from the collecting vessel, the gas phase of which is kept in open communication with the gas phase in the storage vessel, to a point in the reactor system with the same pressure as the reactor vessel or lower, preferably the reactor vessel and/or a point in the primary steam circuit, via one or several conduits containing resistors.

By sub-critical vessels is meant vessels so arranged that the fuel composition cannot become critical in them. The expression primary steam circuit of the reactor has been defined in the introduction to the specification. The collecting and storage vessels and communicating conduits for coolant or fuel composition between these vessels are not considered as belonging to the mentioned primary steam circuit but are auxiliary arrangements to the reactor vessel. The above mentioned resistors have the task of providing a defined and controllable pressure drop. Conventional technique is utilized for the practical manufacture of the resistors. The simplest form of resistor is of course a throttle-valve. The task of this resistor is to give a certain pressure drop. The gas flow through it can be allowed to vary if the means for gas supply require it. As flowing gas is suitably chosen one having a low absorption cross section of neutrons, such as deuterium, helium and oxygen but hydrogen gas, nitrogen gas, neon and argon may also be used with advantage. The choice of gas is influenced by the chemical composition of the reactor core.

The invention will in the following be explained more in detail with reference to the description of the accompanying schematical figures which show different arrangements for performing the method according to the invention.

FIGURE 1 shows an arrangement in which all flowing gas can be led from the collecting vessel to the reactor vessel and condensate formed can be returned to the reactor vessel via the used collecting vessel.

FIGURE 2 shows an arrangement in which flowing gas can be led from the collecting vessel either to the reactor vessel or to a point in the primary steam circuit or to both.

The reactor vessel 1 at normal operation contains a boiling fuel composition, partly consisting of a liquid coolant, in this case heavy or light water which then also acts as moderator.

The fuel composition gives off steam from the coolant, i.e., in this case water vapour, which via the conduit 2 rises into the condenser 3. The steam is condensed here transferring its heat content to the secondary coolant at 4 and withdrawn at 5. The condensate can be returned to the reactor vessel partly directly through the conduit 6 and partly via the collecting vessel 7 via the conduits 8 and 9. The distribution of the condensate between these return ways can be controlled by the valves 35 and 36.

The collecting vessel 7, which is in free liquid transport communication with the reactor vessel 1 via the conduit 9, is arranged on a lower level than the reactor vessel 1. The collecting vessel 7 is also, via the conduit 10, in free liquid transport communication with the storage vessel 11 situated on substantially the same level as the reactor vessel 1. The conduit 10 is connected to the lower part of the collecting vessel 7 at a higher level than the conduit 9. These last mentioned vessels are also in communication with each other via the conduit 12 for gas transport from the vessel 7 to the vessel 11. The conduit 12 contains an openable and closable valve 13 and also a gas cooler 14, the inlet and outlet thereof for secondary coolant being designated 15 and 16 and the return conduit for condensate formed therein being designated 17. Further, to the collecting vessel 7 is connected a supply conduit 18 for gas which is fed forward by the gas pump 19. The conduit 18 also contains a resistor 20 to adjust the flow of gas at a suitable value, and a storage vessel 21 for the gas. The resistor 20 can, if desired, be controlled so that the gas flow in the conduit 18 is independent of the adjustment of the resistor 23. The storage vessel 11 is in communication with the reactor vessel via the conduit 22 for gas transport. This conduit contains a resistor 23 in the form of a controllable throttle valve, and also a gas cooler 24 with inlet and outlet 25 and 26 respectively, for secondary coolant. Condensate formed in this gas cooler is led to the collecting vessel via the conduit 27. The conduits 8, 17 and 27 all open out into the collecting vessel 7 at a lower level than that at which the conduit 10 is connected to this vessel, so that liquid locking occurs.

When the reactor is shut down the valve 13 is completely open and all the fuel composition is in the collecting vessel 7. The remaining effect of the fuel is taken care of by the cooler 14. When the reactor is started the valve 13 is closed and the valve 23 is kept completely open. The flowing gas which is pumped forward through the conduit 18 by the gas pump 19 to the collecting vessel 7, while it fills the collecting vessel 7, forces up a part 28 of the fuel composition into the reactor vessel 1 via the conduit 9 and substantially all remaining fuel composition 29 into the storage vessel 11. If desired the speed of emptying the vessel 7 may be regulated with the valve 13. A small amount of fuel composition 30 will be left in the bottom of the collecting vessel below the connection point of the conduit 10. The storage vessel is arranged at such a level and has such a shape that the part 28 of the fuel composition supplied to the reactor comprises a suitable quantity for the start of the reactor. The volume of the storage vessel 11 is sufficiently large for the remaining fuel composition 29 to be contained therein. When the part 28 of the fuel composition supplied to the reactor vessel comprises the quantity suitable for the start of the reactor, therefore, the liquid surfaces of the parts 28 and 29 of the fuel composition lie in the same horizontal plane, as shown with the broken line in the figure. The gas supplied to the collecting vessel 7 passes the conduit 10 and the liquid 29 before it passes via the completely open valve 23 through the reactor vessel 1 and the primary steam circuit and returns to the gas pump 19 for recirculation. Due to the passage of the gas through the conduit 10 sedimentation of the material dispersed in the fuel composition is prevented.

When boiling has been reached in the reactor the small quantity of fuel composition 30 at the bottom of the collecting vessel 7 is flushed into the reactor and is replaced by condensate from the condenser 3. This causes no appreciable effect change in the reactor. To increase the power over starting power, preferably when intended operating pressure has been reached, the valve 13 is completely opened, whereby the fuel composition 29 in the storage vessel 11 is tapped off to the collecting vessel 7. The distribution of the fuel composition between the collecting vessel 7 and the reactor vessel 1 is regulated now by the resistor 23. During normal operation all the fuel composition is contained in the reactor vessel 1, but when required it is possible to distribute the fuel composition between the reactor vessel 1 and the collecting vessel 7 in a different way and thus alter the reactor effect by adjustment of the resistor 23. Fuel composition remaining at the bottom of the collecting vessel when all fuel composition is transferred to the reactor vessel is flushed into the reactor tank with condensate from the condenser 3 via the conduits 8 and 9. The rapid power changes which might thereby arise are innocent since the reactor is already in operation and pressurized. At shutdown of the reactor the resistor 23 is completely opened.

FIGURE 2 shows a modification of the arrangement according to FIGURE 1 where the flowing gas through the conduit 22 is divided into two branch-conduits 31 and 32 with resistors 33 and 34, where one of the conduits leads to the reactor vessel 1 and the other to the primary steam circuit. It is also possible to lead the gas only to the primary steam circuit, for example by omitting the conduit 32 with resistor 34 according to FIGURE 2. The gas may also be led to some other point in the reactor system with the same pressure as the reactor vessel or lower.

As is clear from the foregoing description, the start of the reactor takes place without the strongly radioactive fuel composition coming into contact with any of the movable parts in the apparatus, which is of decisive importance for operational safety. Another important property of the invention is that it eliminates the risk of rapid power changes during the starting process as a result of uncontrolled fuel supply to the reactor.

As examples of fuel compositions with the use of which the method and means according to the invention can advantageously be put to use may be mentioned dispersions in heavy water or other coolant of thorium oxide with the addition of fissile material such as U233, U235 and Pu239 or solutions of for example uranyl sulphate containing enriched uranium. Suitable operating pressure is between 30 and 80 bar when the steam is to be used for the production of electric power. Otherwise a lower pressure may be used.

I claim:

1. Method of controlling the start-up of a homogeneous nuclear reactor comprising a reactor vessel in a reactor system which reactor vessel during operation contains a fuel composition comprising a fissile material distributed in a liquid cooling medium, from which steam is produced, the heat content of which is carried off during condensation of the steam in a primary steam circuit, the step comprising putting the reactor vessel with a conduit in free liquid transport communication with a sub-critical collecting vessel arranged at a lower level and having sufficiently large volume to contain at shutdown of the reactor, fuel composition necessary for operation of the reactor, putting the collecting vessel with another conduit in free liquid transport communication with a sub-critical storage vessel arranged substantially at the same level as the reactor vessel, and forcing up the fuel composition which before the start-up is stored in the collecting vessel by effecting a pressure difference between the gas phases in on the one side the collecting vessel and on the other side the reactor vessel and the storage vessel into the reactor vessel and the storage vessel through the conduits between respective vessels with such distribution of the fuel composition between the reactor vessel and the storage vessel that the reactor vessel is supplied with an amount of fuel composition adapted for start-up of the reactor and the storage vessel with substantially all remaining fuel composition, whereupon after the part of the fuel composition forced up to the reactor vessel has reached desired reactivity, returning the part of the fuel composition supplied to the storage vessel, by equalizing the pressure difference in the gas phases between the collecting vessel and the storage vessel to the collecting vessel and distributing it between the collecting vessel and the reactor vessel by effecting a pressure difference between the gas phases in on the one side in the reactor vessel and on the other side the collecting vessel and the storage vessel so that a desired reactor power is effected.

2. Method according to claim 1, in which the pressure difference between the gas phases in on the one side the collecting vessel and on the other side the reactor vessel and the storage vessel for the transmission of the fuel composition from the collecting vessel to the reactor vessel and the storage vessel is effected with a flowing gas, which is led into the collecting vessel and after having forced up the fuel composition into the reactor vessel and the storage vessel the gas phases of which are kept in open communication with each other, is led through the conduit between the collecting vessel and the storage vessel and through the storage vessel and through the fuel composition forced up to the storage vessel.

3. Method of controlling the start-up of a homogeneous nuclear reactor comprising a reactor vessel in a reactor system which reactor vessel during operation contains a fuel composition comprising a fissile material distributed in a liquid cooling medium, from which steam is produced, the heat content of which is carried off during condensation of the steam in a primary steam circuit, the step comprising putting the reactor vessel with a conduit in free liquid transport communication with a sub-critical collecting vessel arranged at a lower level and having sufficiently large volume to contain at shutdown of the reactor, fuel composition necessary for operation of the reactor, putting the collecting vessel with another conduit in free liquid transport communication with a sub-critical storage vessel arranged substantially at the same level as the reactor vessel, and forcing up the fuel composition which before the start-up is stored in the collecting vessel by effecting a pressure difference between the gas phases in on the one side the collecting vessel and on the other side the reactor vessel and the storage vessel into the reactor vessel and the storage vessel through the conduits between respective vessels with such distribution of the fuel composition between the reactor vessel and the storage vessel that the reactor vessel is supplied with an amount of fuel composition adapted for start-up of the reactor and the storage vessel with substantially all remaining fuel composition, the pressure difference between the gas phases in on the one side the collecting vessel and on the other side the reactor vessel and the storage vessel for the transmission of fuel composition from the collecting vessel to the reactor vessel and the storage vessel being effected with a flowing gas being led into the collecting vessel and after having forced up the fuel composition into the reactor vessel and the storage vessel the gas phases of which are kept in open communication with each other, being led through the conduit between the collecting vessel and the storage vessel and through the storage vessel and through the fuel composition forced up to the storage vessel, whereupon after the part of the fuel composition forced up to the reactor vessel has reached desired reactivity, returning the part of the fuel composition supplied to the storage vessel, by equalizing the pressure difference in the gas phases between the collecting vessel and the storage vessel to the collecting vessel and distributing it between the collecting vessel and the reactor vessel by effecting a pressure difference between the gas phases in on the one side in the reactor vessel and on the other side the collecting vessel and the storage vessel so that a desired reactor power is effected, the flowing gas led to the collecting vessel being used for effecting the pressure difference between the gas phases in on the one side the reactor vessel and on the other side the collecting vessel and the storage vessel for distribution of the part of the fuel composition forced up to the storage vessel between the reactor vessel and the collecting vessel, by leading the gas between the collecting vessel, the gas phase of which is kept in open communication with the gas phase in the storage vessel, and a point in the reactor system with at the most the same pressure as the reactor vessel, via at least one conduit containing adjustable regulating means producing a resistance to the flow of gas.

4. Homogeneous nuclear reactor in a reactor system comprising a reactor vessel, which during operation contains a fuel composition comprising a fissile material distributed in a liquid cooling medium, from which steam is produced, the heat content of which is carried off during condensation of the steam in a primary steam circuit, a subcritical collecting vessel arranged at a lower level than the reactor vessel and having sufficiently large volume to contain, at shutdown of the reactor, the fuel composition necessary for operation of the reactor, an open conduit for liquid transport connecting said reactor and collecting vessels, means connected to the collecting vessel for supplying gas thereto, a sub-critical storage vessel arranged substantially on the same level as the reactor vessel, means connecting the collecting vessel with the subcritical storage vessel, partly by an open conduit for liquid transport and intermittent gas transport connected to the collecting vessel at a higher level than the conduit coming from the reactor vessel and partly with an openable and closable conduit for gas transport, at least one conduit for the flow of gas connecting the storage vessel to a point in the reactor system with at most the same pressure as the reactor vessel, said last conduit containing adjustable regulating means producing resistance to a flow of gas therethrough.

References Cited by the Examiner
UNITED STATES PATENTS

| | | | |
|---|---|---|---|
| 2,840,522 | 6/58 | Young et al. | 176—47 |
| 2,991,236 | 7/61 | Vernon | 176—47 |

FOREIGN PATENTS

| | | | |
|---|---|---|---|
| 913,714 | 12/62 | Great Britain | 176—47 |

OTHER REFERENCES

Lindstrom et al.: "ASEA Research," No. 7, August 1962, pages 239–266, publ. by ASEA, Vasteras, Sweden.

CARL D. QUARFORTH, *Primary Examiner.*

REUBEN EPSTEIN, *Examiner.*